Oct. 4, 1955

H. W. McDONALD 2,719,620

TRANSVERSELY ENGAGED FLUID OPERATED CLUTCH

Filed Jan. 6, 1951

INVENTOR.
Harry W. McDonald
BY
Fishburn + Mullendore
ATTORNEYS

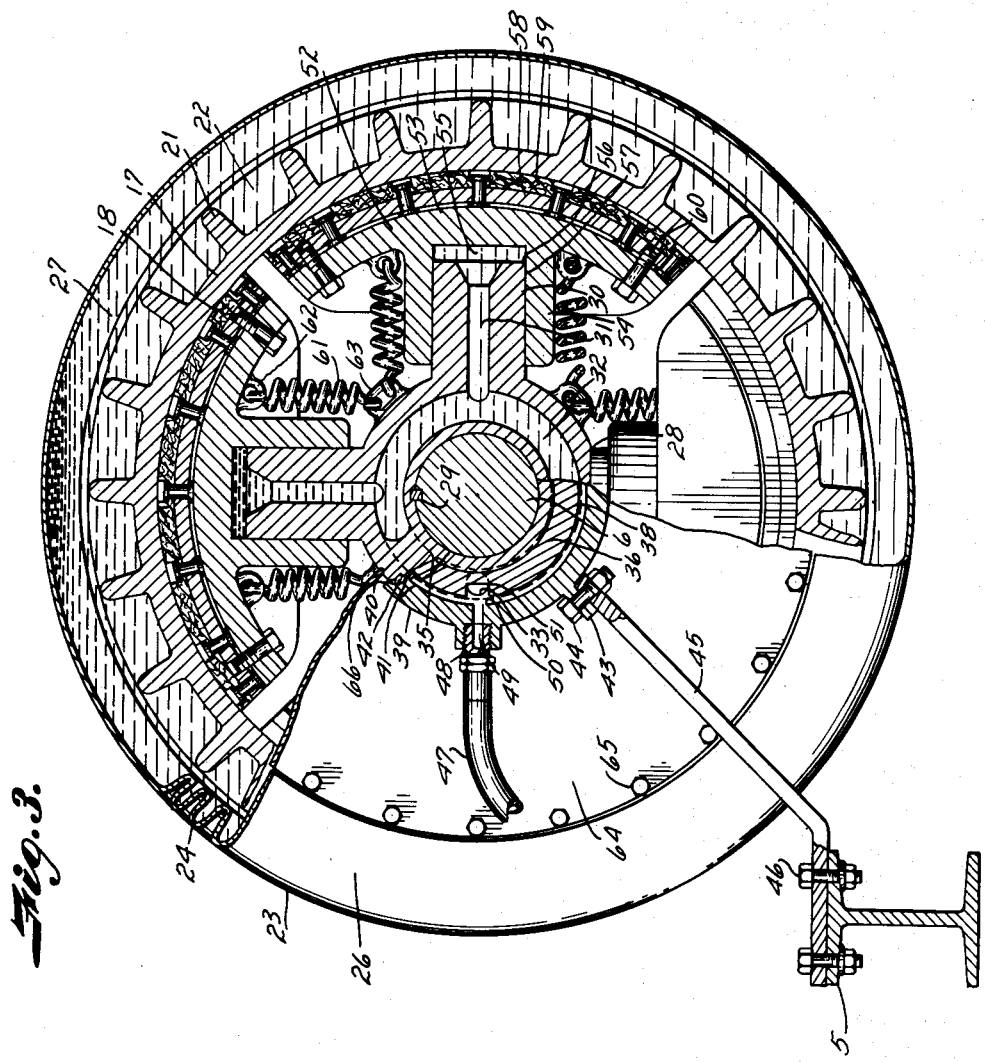

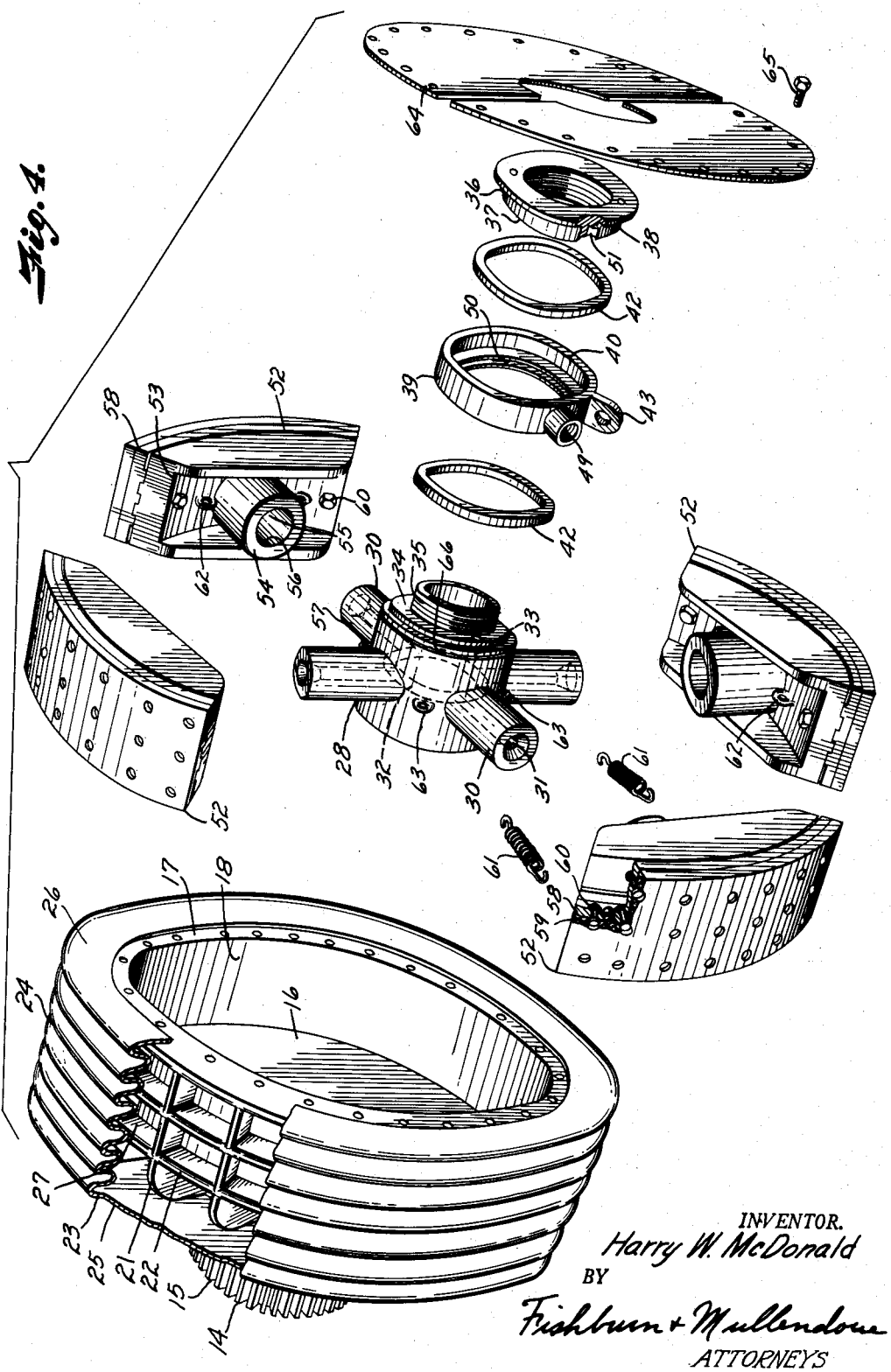

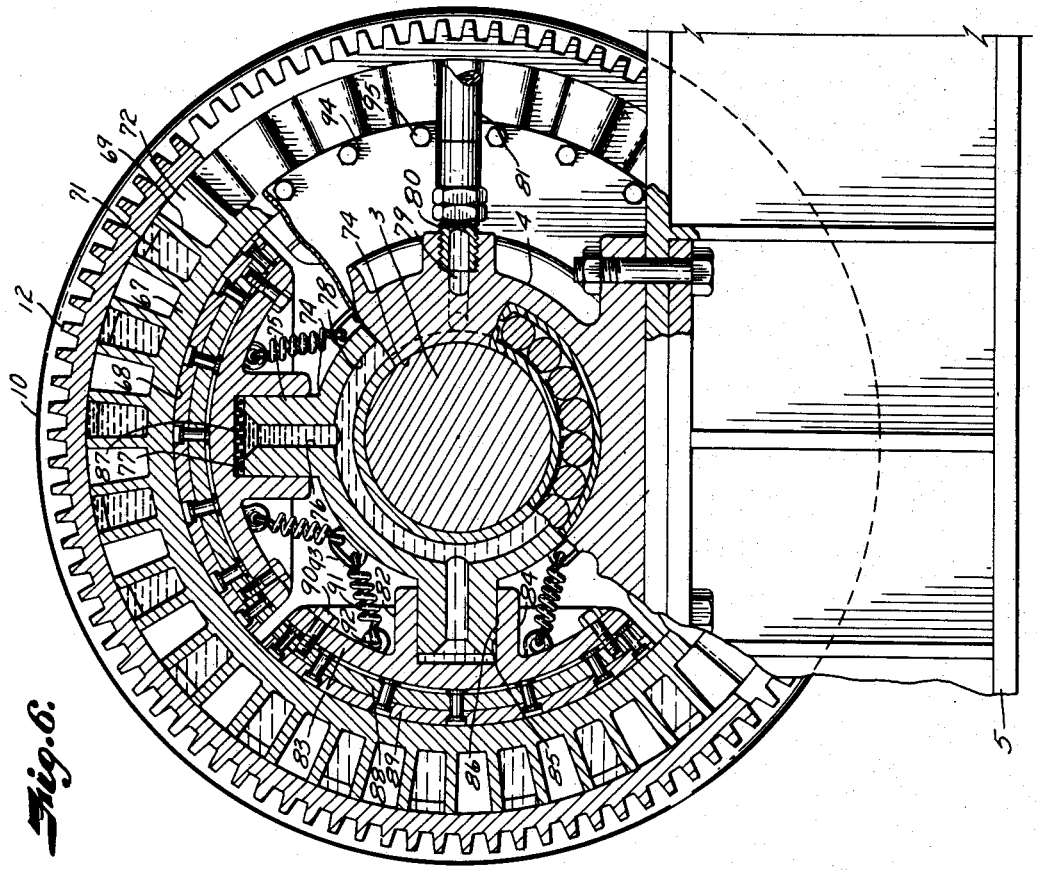

United States Patent Office 2,719,620
Patented Oct. 4, 1955

2,719,620

TRANSVERSELY ENGAGED FLUID OPERATED CLUTCH

Harry W. McDonald, Minneapolis, Minn., assignor, by mesne assignments, to McDonald & Eide, Inc., South St. Paul, Minn., a corporation of Delaware Application January 6, 1951, Serial No. 204,740

1 Claim. (Cl. 192—85)

This invention relates to hydraulically operated power transmission structures, and more particularly to such structures having relatively rotatable members and hydraulically operated devices for effecting frictional engagement for retarding and/or stopping the relative rotation.

The objects of the present invention are to provide an hydraulically operated power transmission structure having relatively rotatable devices with expansible fluid pressure chambers for effecting frictional engagement of members thereon for retarding and/or stopping the relative rotation; to provide an hydraulically operated power transmission structure having relatively rotatable devices, one of which includes a spider having pistons radially disposed thereon and brake shoes with cylinders sleeved on the pistons whereby the shoes are movable radially to engage friction surfaces on the other rotatable device; to provide such a spider arrangement with internal passages communicating with the fluid pressure chambers in the piston and cylinder arrangements and a stationary member rotatably mounted on the spider providing communication between a fluid pressure line and the internal passages whereby the only pressure seals required are between the stationary member and spider; to provide resilient members for effecting disengagement of the shoe frictional surfaces from the frictional surfaces of said other rotatable member; to provide hydraulically operated brake and clutch structures for operating a winding drum of a drawworks; to provide hydraulically operated power transmission structures operable as clutches to effect driving connection between a driving and driven member and as a brake for retarding rotation of a driven member; to provide a cooling fluid chamber peripherally of the transmission structures; to provide an arrangement for conducting hydraulic fluid to the cylinder and piston arrangements for operating the transmission structures with a minimum of parts and fluid seals; and to provide a simple, efficient, hydraulically operated power transmission structure which is economical to manufacture, efficient in operation, easily maintained to provide positive operation of the frictional engaging members.

In accomplishing these and other objects of the present invention, I have provided improved details of structure, the preferred forms of which are illustrated in the accompanying drawings, wherein:

Fig. 3 is an end elevation of the clutch structure, portions being broken away to better illustrate the structure thereof.

Fig. 4 is a detail perspective view of the clutch parts shown in spaced, disassembled relation.

Fig. 5 is a longitudinal sectional view through one end of the drum, particularly illustrating the transmission structure thereon for operation as a brake.

Fig. 6 is an end elevation of the winding drum with portions broken away to illustrate the brake structure.

Figures 1, 2:
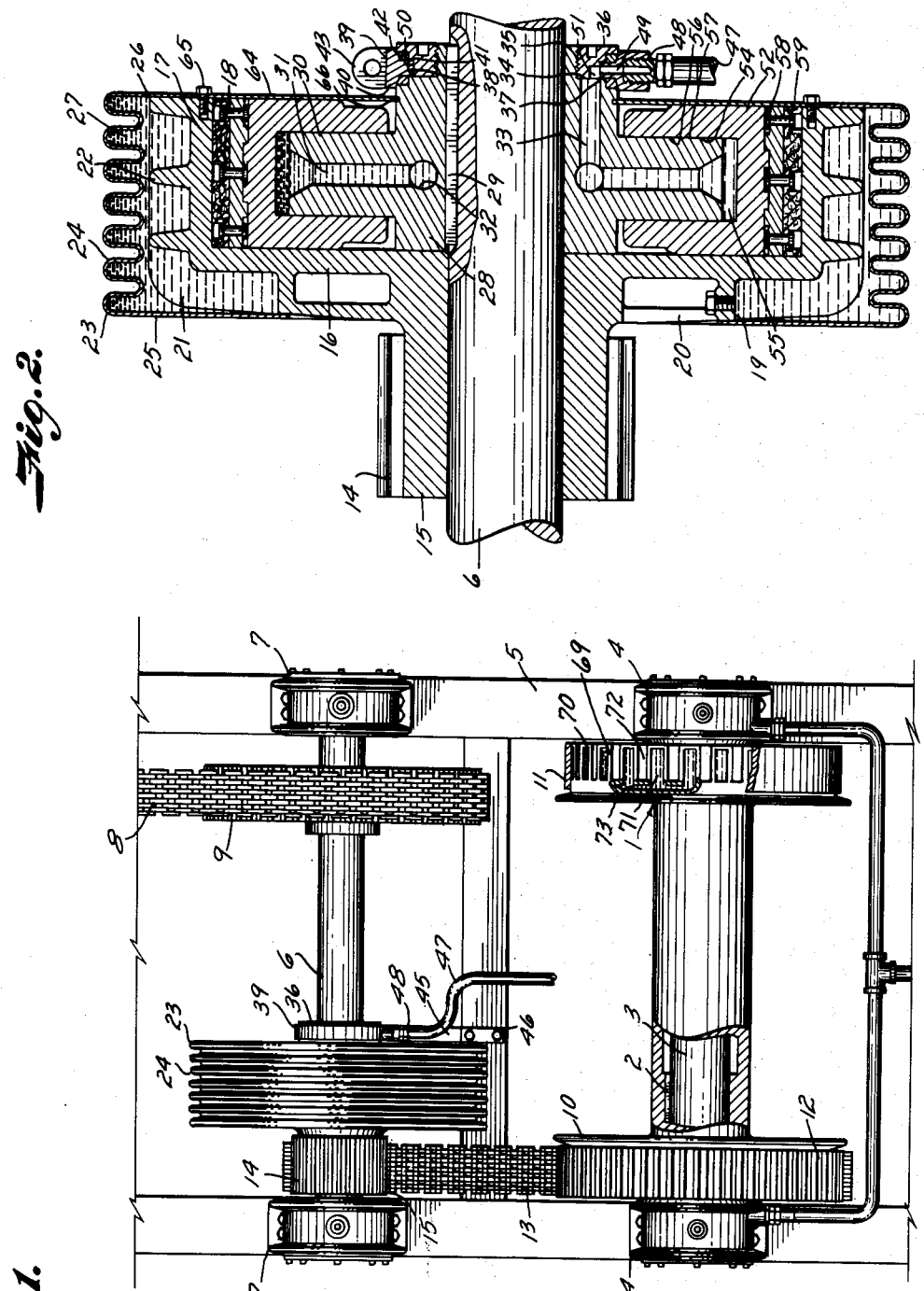
Fig. 1 is a plan view of a winding drum arranged for operation under control of a clutch and brakes embodying the features of the present invention.
Fig. 2 is a longitudinal sectional view through the power transmission structure for operation as a clutch.

Referring more in detail to the drawings:

1 designates a winding drum suitably fixed as by keys 2 to a drum shaft 3, the ends of said shaft being rotatably mounted in suitable spaced bearings 4 carried by a frame 5. A countershaft 6 is spaced from and preferably parallel to the drum shaft 3, the ends of the countershaft 6 being rotatably mounted in suitable bearings 7 also carried on the frame 5. The countershaft is driven from a suitable source of power (not shown) by a chain 8 which operates over a sprocket 9 suitably fixed on the countershaft 6.

The winding drum 1 is provided with spaced flanges 10 to define the portion on which cable or the like is wound. Outwardly extending annular flanges 11 are suitably fixed to the flanges 10 and at least one of the flanges 11 has sprocket teeth 12 arranged on the periphery thereof for operative engagement by a chain 13 for driving the winding drum. The chain 13 also has operative engagement with sprocket teeth 14 on a hub 15 of a clutch drum rotatably mounted on the countershaft 6. One end of the hub 15 has an integral, radial flange 16 terminating in an annular clutch flange 17 having an internal cylindrical clutch face 18 concentric with the countershaft 6. A flange 19, integral with the radial flange 16, extends therefrom oppositely to the clutch flange 17, the flange 19 preferably being concentric with the countershaft 6 and substantially midway between the hub 15 and the clutch flange 17. The outer end of the flange 19 is connected by a web 20 with the hub 15 adjacent the sprocket teeth 14 thereon. A plurality of spaced ribs 21 extend radially from the flange 19 and across the outer periphery of the clutch flange 17, the ribs 21 being connected with a plurality of spaced, radial ribs 22 on the clutch flange 17. The ribs 21 and 22 form heat dissipating members and are enclosed by a shell 23 having a corrugated periphery 24 and end walls 25 and 26 suitably secured to the ends of the flange 19 and clutch flange 17 respectively to form a liquid-tight chamber 27 for containing a coolant 27' for facilitating transmission of heat from the clutch flange to the shell for dissipation of said heat.

A spider 28 is fixed to the countershaft 6 as by a key 29 with one end adjacent the radial flange 16. The spider 28 is provided with a plurality of diametrically opposed, radially extending projections or pistons 30, cylindrical in cross-section, the center of said projections 30 being substantially midway the length of the clutch face 18. Each of the projections 30 is provided with central passages 31 opening from the outer ends of the projections with the inner ends of said passages communicating with a circular passage 32 preferably concentric with and spaced from the countershaft 6, as illustrated in Fig. 2. A longitudinal bore 33 has communication with the circular passage 32 and extends therefrom through the spider to the end 34 thereof opposite to the radial flange 16. The end 34 of the spider has an external threaded extension 35 of reduced diameter and concentric with the countershaft 6.

A collar 36 is threaded on the extension 35 with the end 37 of the collar in engagement with the end 34 of the spider. The collar is provided with a peripheral groove 38 adjacent the end 37 for rotatably mounting a ring 39 which has oppositely extending annular flanges 40 extending over the adjacent peripheries of the spider and collar and cooperating with peripheral grooves 41 therein for enclosing packing rings 42 having sealing engagement with the surfaces of the ring and peripheral grooves in the spider and collar to prevent leakage of hydraulic pressure fluid. The ring 39 has an ear 43 secured by suitable fastening devices 44 with one end of a bracket 45 which has the opposite end thereof suitably secured as by fastening devices 46 to a portion of the frame 5 to retain the ring 39 in stationary position. A fluid pressure conveying line 47 is connected by a suitable fitting 48 to the ring 39, having communication through a passage 49 with an internal groove 50 in the ring, said groove communicating through a port 51 with the bore 33.

Movable elements 52 consisting of arcuate members 53 and integral sleeves or cylinders 54 are slidably mounted on each of the projections or pistons 30, the inner ends of the sleeves being closed and cooperating with the ends of the projections 30 to form fluid pressure chambers 55 therebetween. The inner surfaces 56 of the sleeves closely engage the peripheral surface 57 of the projections 30 to form fluid-tight bearing engagement therebetween, yet permit relative sliding movement. Arcuate clutch shoes 58 having suitable friction lining 59 secured as by riveting thereto are secured as by suitable fastening devices 60 to the peripheral surfaces of the arcuate members 53. The shoes 58 and lining 59 thereon are preferably substantially the same width as the clutch face 18 and are preferably the same length as the arcuate members 53 whereby the ends of the arcuate members and shoes are spaced from the adjacent arcuate members and shoes to provide suitable clearance, yet permit utilization of substantially all of the clutch face 18 for maximum frictional engagement between the relatively rotatable portions of the clutch.

Application of fluid pressure from a suitable source of supply through the conveying line 47, passage 49, groove 50, port 51, bore 33, circular passage 32 and passages 31 provides fluid pressure in each of the fluid pressure chambers 55, forcing the movable elements 52 radially to effect engagement of the friction linings 59 with the clutch face 18. Since the spider 28 is keyed to the countershaft 6, rotation of said shaft will drive the spider and through engagement of the projections 30 with the movable elements 52 and the frictional engagement of the friction lining 59 with the clutch face 18 will drive the hub 15 and effect operation of the chain 13. When fluid pressure is released the movable elements are drawn toward the countershaft 6 to effect declutching of the friction lining 59 from the clutch face 18 by means of a plurality of resilient members 61. The resilient members are preferably coil springs arranged on opposite sides of the sleeves 54 and each having one end connected to an ear 62 on the arcuate member 53 and the other end connected to an ear 63 on the spider 28 between the projections 30. This arrangement of the springs provides substantially equal retracting force on the movable elements on opposite sides of the projections 30 and also tends to maintain substantial alignment of said movable elements. However, the spacing between the movable elements and the radial flange 16 is small and said flange 16 will also tend to maintain the movable elements in alignment.

Any heat created by relative movement between the friction linings 59 and clutch face 18, as when effecting clutching and declutching thereof, is transmitted through the flanges 16 and 17 and ribs 21 and 22 to the coolant 27' and then through the shell 23 for dissipation to the atmosphere. The movable elements 52 are preferably enclosed by means of a split disk 64, having its outer edges secured to the ends of the flange 17 by suitable fastening devices 65, the inner edges of the disk preferably operating in a peripheral groove 66 in the spider.

The embodiment of the invention in the form of a brake for retarding and/or stopping rotation of the winding drum 1 of a drawworks is illustrated in Figs. 1, 5 and 6, identical brake structures preferably being arranged at each end of the winding drum.

Each of the radial flanges 10 are preferably provided with integral, outwardly extending annular flanges 67, spaced inwardly and concentric with the flanges 11. The brake flanges 67 have internal, cylindrical brake faces 68 which are concentric with the shaft 3. The brake flange 67 is preferably provided with integral, radially extending ribs 69, the peripheral edges of which are suitably secured to the annular flange 11 and alternate ends of said ribs are connected by walls 70 to provide alternate fluid coolant chambers 71, the intermediate chambers 72 being open to atmosphere for dissipation of heat thereto. The fluid coolant chambers 71 each have communication with a passage 73 adjacent the radial flange 10.

A spider 74, having a bore 74', is sleeved over the shaft 3. The spider is illustrated as being integral with the bearing 4, however, it may be separate and suitably secured thereto. The spider 74 has a plurality of diametrically opposed, radially extending projections or pistons 75, circular in cross-section, and preferably disposed with the center thereof substantially midway the width of the brake surface 68. Each of the projections 75 is provided with a central passage 76 opening from the outer end 77 of said projections with the inner ends of the passages having communication with a circular passage 78 in the spider concentric with and spaced from the shaft 3. The circular passage 78 communicates with a passage 79 which extends through the spider and has a fitting 80 externally disposed for connection to a fluid pressure conveying line 81. Movable elements 82 consisting of arcuate members 83 and sleeves or cylinder members 84 are slidably mounted on the projections 75, the inner surfaces 85 of the sleeves 84 closely engaging the peripheral surface 86 of the projections 75. The arcuate member 83 closes the end of the sleeve 84 and cooperates with the end 77 of the projections 75 to form fluid pressure chambers 87. Shoes 88 having friction lining 89 secured thereon by rivets or the like are attached to the periphery of the arcuate members by suitable fastening devices 90 whereby fluid pressure delivered to the chambers 87 moves the movable elements radially to effect engagement of the peripheries of the friction lining 89 with the brake surface 68 of the brake flange 67. Upon release of pressure the movable elements are retracted to disengage the friction lining from the brake surface 68 by means of resilient members 91 preferably in the form of coil springs arranged on opposite sides of the sleeves 84 and having one end connected to ears 92 on the arcuate members 83 and the other ends connected to ears 93 on the spider 74. The movable elements are preferably enclosed by means of a disk 94 having its outer edges suitably secured to the end of the brake flange 67 by suitable fastening devices 95, the inner edges 96 of the disk member being disposed adjacent the spider 74 or bearing 4.

With an apparatus constructed as described and the movable elements 82 in retracted position, operation of the chain 8 rotates the sprocket 9 and drives the countershaft 6 and the spider 28 keyed thereto. When the movable elements 52 are in retracted position, the hub 15 remains stationary. With the application of fluid pressure to the line 47, said fluid pressure is transmitted through the respective passages to the fluid pressure chamber 55, effecting movement of the movable elements radially and clutching engagement of the peripheries of the friction lining 59 with the clutch face 18, providing a driving engagement which effects rotation of the flanges 17 and 16, driving the hub 15 to operate the chain 13 which operates on the sprocket 12 to drive the winding drum 1. Upon release of fluid pressure in the line 47, the resilient members 61 retract the movable elements 52 to declutch the friction lining 59 from the clutch face 18, then by applying fluid pressure to the conveying line 81, the pressure is communicated through the respective passages to the fluid pressure chambers 87, moving the movable elements 82 radially to effect engagement of the peripheries of the friction lining 89 with the brake surface 68. The spider 74 and movable elements thereon being held stationary due to being integral with or connected with the bearing 4, retards the rotation of the winding drum 1 and will stop same if so desired. Heat created by slippage between the friction elements and the faces engaged thereby is conducted through the coolant and dissipated to the atmosphere.

It is believed obvious that I have provided an hydraulically operated power transmission structure adapted for use as a clutch or brake, particularly for winding drums of a drawworks, said structure having few movable parts and capable of positive and efficient operation and easy maintenance.

What I claim and desire to secure by Letters Patent is:

An hydraulically operated clutch comprising, a rotatably mounted shaft, a clutch member on the shaft and having a radial flange terminating in an annular clutch flange concentric with said shaft, a spider hub fixed on the shaft within the annular flange and having a plurality of diametrically opposed radially extending projections cylindrical in cross section and spaced from the radial flange, a plurality of clutch shoes each including a cylindrical body closed at one end and slidably sleeved on the respective projections and cooperating therewith to form pressure chambers in the bodies, said spider hub having connected fluid passages therein spaced from the shaft and extending from adjacent one end of the spider hub through the projections to the pressure chambers for introducing fluid pressure to said chambers, the portion of said fluid passages adjacent said one end of the spider hub having connection with a source of fluid pressure, arcuate members on each of the clutch shoes within the annular flange and having outer surfaces substantially concentric with said annular flange, a side face on said arcuate members spaced slightly from the radial flange to provide operating clearance therebetween, friction surfaces fixed on the outer surfaces of the arcuate members of the clutch shoes and adapted to be moved radially into engagement with the inner surface of the annular clutch flange upon introduction of fluid pressure into the fluid chambers, plate means secured to the annular flange and engaging the spider hub in spaced relation to the radial flange for cooperating therewith in enclosing the clutch shoes, and a pair of springs arranged alongside in diametrically opposed relation to the clutch shoe body members, each of said springs having an end connected to the spider and another end connected to the arcuate members of the clutch shoes whereby said springs operate to retract the shoes from the annular clutch flange upon release of fluid pressure in the pressure chambers and aid in maintaining alignment of said shoes and thereby reduce frictional engagement between the arcuate members and the radial flange.

References Cited in the file of this patent

UNITED STATES PATENTS

| | | |
|---|---|---|
| 467,288 | Jennings | Jan. 19, 1892 |
| 574,209 | McFadden | Dec. 29, 1896 |
| 1,985,291 | Hodges | Dec. 25, 1934 |
| 2,177,213 | Gleasman | Oct. 24, 1939 |
| 2,197,292 | Brady | Apr. 16, 1940 |
| 2,338,476 | Wittkop | Jan. 4, 1944 |
| 2,468,388 | Wilson | Apr. 26, 1949 |
| 2,538,997 | Weiland | Jan. 23, 1951 |

FOREIGN PATENTS

| | | |
|---|---|---|
| 18,143 | Germany | May 25, 1882 |
| 3,517 | Great Britain | Nov. 18, 1899 |